July 25, 1950  V. E. GLEASMAN  2,516,461
HYDRAULIC VANE TYPE CLUTCH
Filed Jan. 20, 1947  3 Sheets-Sheet 1
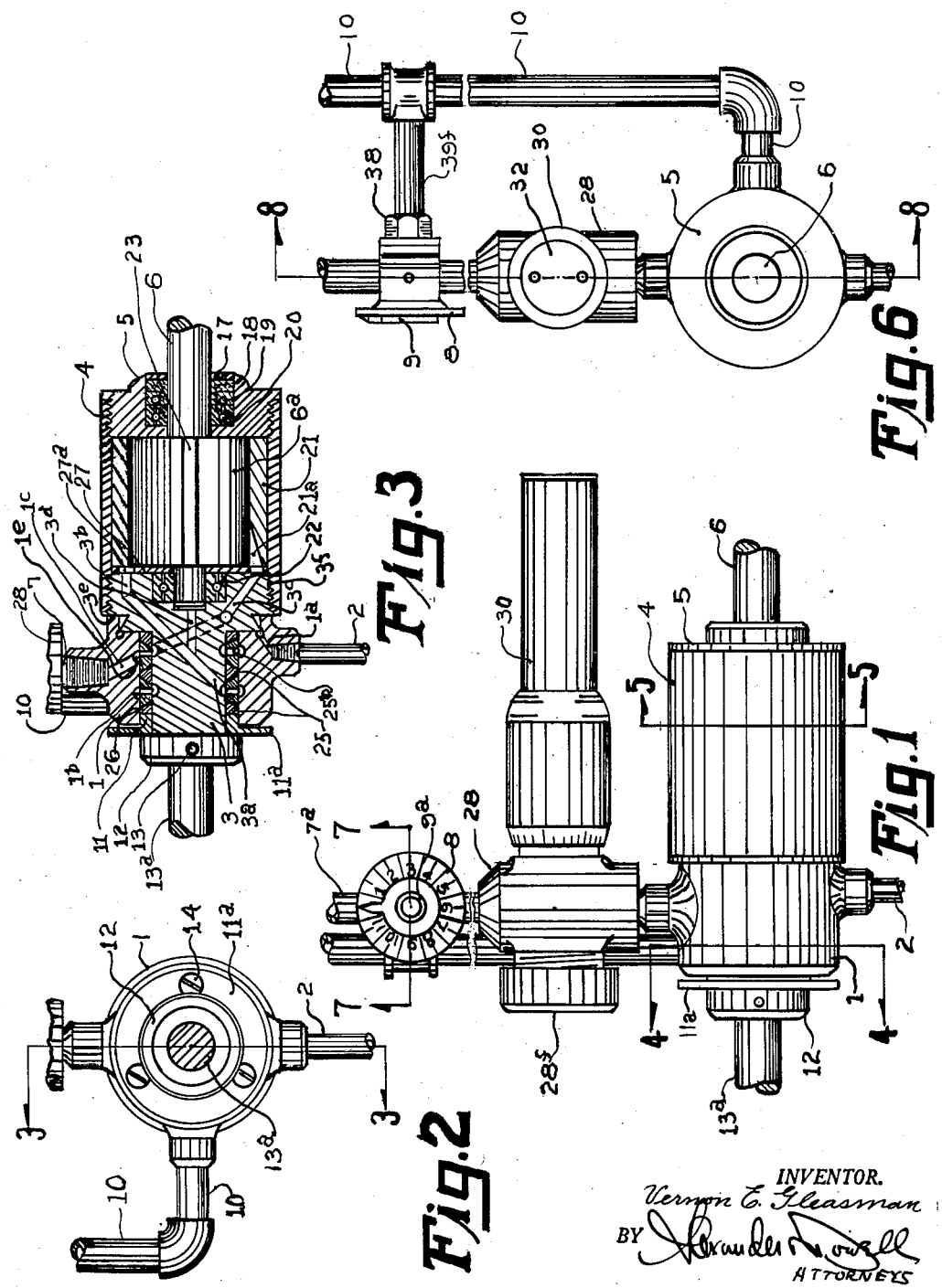
INVENTOR.
Vernon E. Gleasman
BY
ATTORNEYS

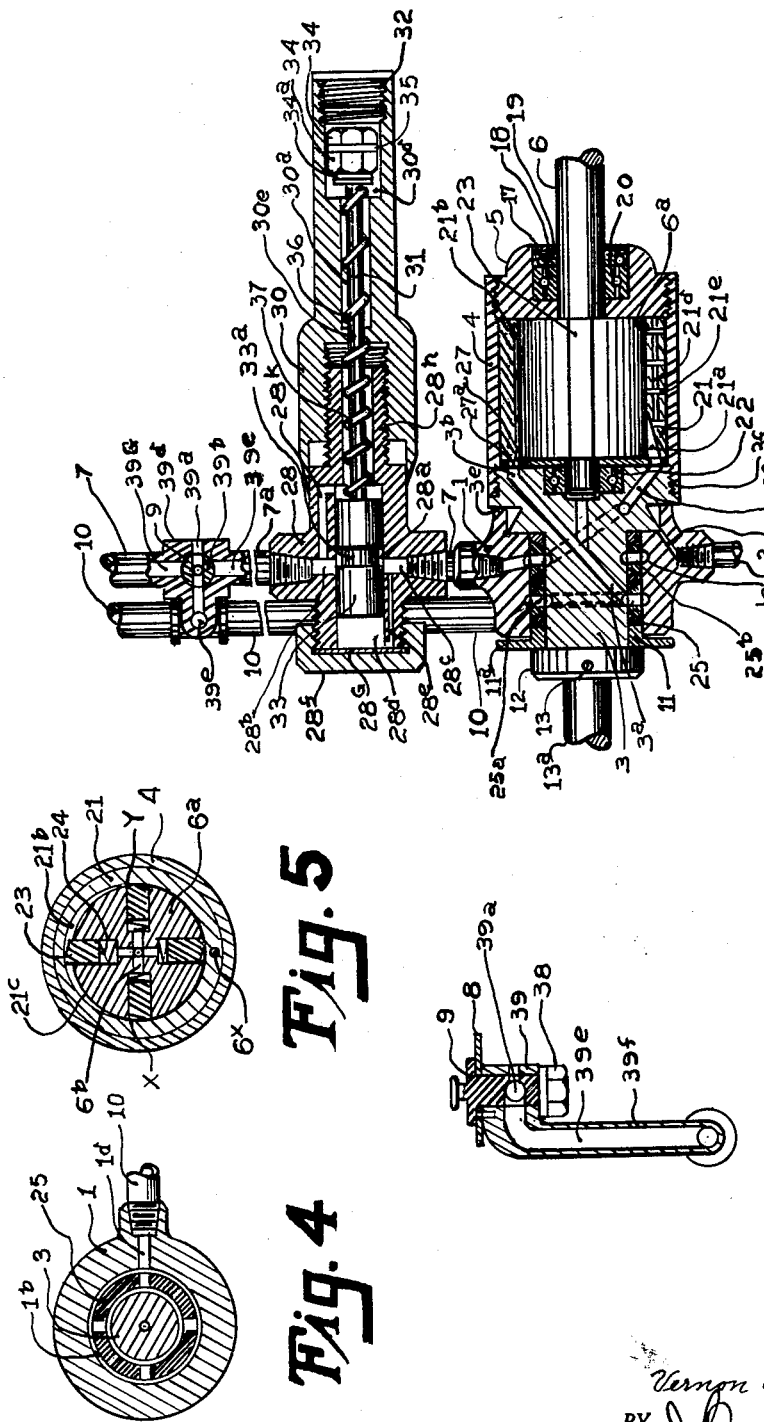

July 25, 1950  V. E. GLEASMAN  2,516,461
HYDRAULIC VANE TYPE CLUTCH
Filed Jan. 20, 1947  3 Sheets-Sheet 3
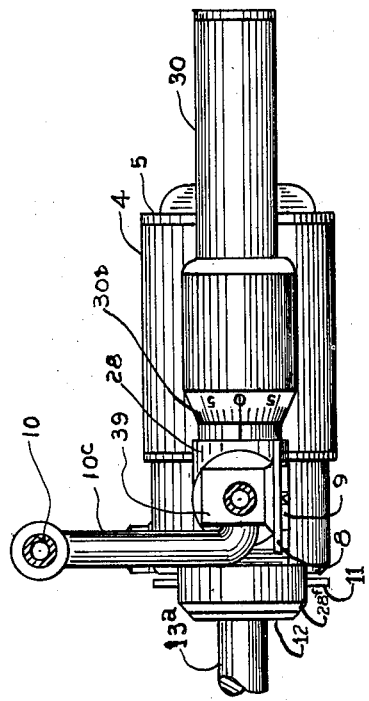

Patented July 25, 1950

2,516,461

UNITED STATES PATENT OFFICE 2,516,461

HYDRAULIC VANE TYPE CLUTCH

Vernon E. Gleasman, Elmira, N. Y.

Application January 20, 1947, Serial No. 723,149

12 Claims. (Cl. 192—58)

This invention is a novel variable speed fluid drive, and the principal objects thereof are to provide a drive of the above type consisting of relatively few parts and of simple construction, the same being provided with a manual control, or automatic governor to maintain constant speed under variable loads; also a drive that will be positive due to the design, and which will be reversible, and a drive having an adjustable torque governor.

Heretofore fluid drives have been manufactured, the same utilizing standard pump principles which involve maximum volume and minimum horsepower requirements and which do not approach positive displacement, whereas in my drive the pump is designed for minimum volume and maximum horsepower and positive displacement, and therefore for this reason my drive has proven to be most efficient and practical.

Other minor objects of the invention will be hereinafter set forth.

I will explain the invention with reference to the accompanying drawings, which illustrate one practical embodiment thereof to enable others familiar with the art to adopt and use the same; and will summarize in the claims, the novel features of construction, and novel combinations of parts, for which protection is desired.

In said drawings:

Fig. 1 is a side elevation of my novel fluid drive assembled with a governor or manual control.

Fig. 2 is a front end view of the drive.

Fig. 3 is a vertical section on the line 3—3, Fig. 2.

Fig. 4 is a vertical section on the line 4—4, Fig. 1.

Fig. 5 is a section on the line 5—5, Fig. 1.

Fig. 6 is a rear end view of the fluid drive and governor or manual control shown in Fig. 1.

Fig. 7 is a detail section through the manual control.

Fig. 8 is a longitudinal section through the fluid drive and overload torque governor and the manual control on the line 8—8, Fig. 6.

Fig. 9 is an end view showing the eccentric sleeve in the outer impeller housing of the drive arranged for reversal of rotation of the drive shaft i. e., 180° from the position shown in Fig. 5.

Fig. 10 is a view of the impeller shown in Fig. 5 with the blades reversed for reversal of rotation of the driven shaft.

Fig. 11 is a side elevation partly in section, of the impeller shown in Fig. 10.

Fig. 12 is a top plan view of the governor, optional manual control, and drive.

As shown more particularly in Figs. 3 and 8, the variable speed fluid drive preferably comprises a gland housing 1 of annular shape adapted to receive a rotary hub 3, rotatably mounted therein, said hub 3 being connected directly with the drive shaft 13a and having an enlarged head 3e at one end of substantially the same outer diameter as the housing 1 against which the same makes a running fit.

Between the hub 3 and the housing 1 are spaced gland packings 25 forming annular chambers around the hub 3 for inlet and outlet of fluid as hereinafter explained, the inlet being numbered 25a and the outlet 25b. Inlet 25a communicates with an annular inlet groove 1b within the bore of the casing housing 1, which in turn is connected through duct 1d, Fig. 4, with a fluid inlet pipe 10 while outlet 25b communicates with an annular groove 1e in the bore of housing 1 communicating directly through duct 1c with the outlet pipe 7 of the housing. The outside pipes 10 and 7 serve as a radiating means for dissipating heat and controlling oil temperatures.

Hub 3 is formed with an inlet duct 3a extending therethrough communicating at one end with the inlet channel 25a and its other end discharging as at 3b adjacent the outer end of the enlarged head 3e of hub 3 adjacent its periphery. Within hub 3 is also a discharge duct 3c extending from the outer end of the enlarged head 3e adjacent the periphery and preferably substantially diametrically opposite the inlet port 3b, said duct 3c extending through the hub 3 and terminating at the discharge channel 25b.

The housing 1 is held to the hub 3 by means of a collar 12 on drive shaft 13a secured by a set screw 13 or the like, and a gland 11 is interposed between the collar 12 and the outer ends of the gland packings 25 to prevent passage of oil outwardly to the collar 12 along hub 3, gland 11 having a flange 11a which is secured by screws 14 or the like, Figure 2, to the adjacent end of housing 1. An annular drainage space is provided between the housing and head 3e adapted to collect oil at the opposite end of the housing 1 and return same through duct 1a into a drainage pipe 2 as shown in Figs. 3 and 8 to a suitable oil receptacle or reservoir (not shown).

The periphery of head 3e of hub 3 is threaded as at 3f and an outer impeller housing 4 is secured by internal threads thereto at one end, the housing having its opposite end internally threaded to receive a bearing housing 5 containing a bearing 20, a seal packing 19, a seal 18 and a sealing ring 17 for the driven shaft 6 as shown in Fig. 3. Shaft 6 extends through the bearing 20 into an inner impeller housing 21 and has its inner end journaled in a bearing 22 in the end of the head 3e of hub 3, bearing 22 being housed in a recess in the head 3 connected by a duct 3d (Fig. 3) with the inlet duct 3a within the hub 3 or it might be connected to outlet duct 3c instead to provide pressure beneath blades 23 to aid or replace the springs 24, hereinafter referred to.

Fixedly mounted on shaft 6 within the outer impeller housing 4 is an impeller 6a which rotates within the eccentric inner impeller housing 21, said inner housing 21 being capable of 180° rotation within the outer housing 4 and being locked with respect to the outer housing 4 in one of the two 180° positions by a pin 6x, Fig. 5, in the end of the inner housing 21 and entering one of two blind holes spaced 180° apart in the end 3e of the hub 3.

As shown more particularly in Fig. 5, the lower half of the bore of the inner impeller housing is arcuate and makes a sliding fit around the lower periphery of the impeller 6a, while the upper half of the bore is arcuate but eccentrically disposed with respect to the axis of the impeller 6a so as to leave spaces denoted by the reference numerals 21b and 21c, Fig. 5, between the upper periphery of impeller 6a and the bore of the inner impeller housing.

Mounted in slots spaced around the periphery of impeller 6a are a plurality of blades 23, four being shown in Fig. 5, the same being yieldably urged radially outwardly by means of springs 24 disposed between the inner end of the blades 23 and the bottoms of the slots therefor in the impeller 6a, the inner end of the slots being connected by intercommunicating ducts 6b, Figs. 5 and 11, which extend through the impeller 6a to a central duct 6c which extends through the inner end of shaft 6 and communicates with the bore 3d (Fig. 3) in hub 3, in order to release vacuum or fluid from the slots for blades 23 so that the blades 23 may oscillate or move freely in and out of their slots at all times.

As shown in Fig. 3, the lower thicker inner end of the inner impeller housing 21 is cut away or recessed as at 21a opposite the outlet duct 3c, and a thrust plate 27 is preferably interposed between the inner end of impeller 6a and the adjacent wall of head 3e of hub 3 to maintain the impeller 6a properly spaced within the outer impeller housing 4, said plate 27 being of the same diameter as the interior of housing 4 and having port holes 27a therein opposite the inlet port 3b and the outlet port 3c of hub 3.

As shown in Figs. 1, 7 and 8, a manually controlled valve is provided in the outlet pipe 7 adopted to control the speed of the driven shaft 6 by controlling the flow of fluid through the outlet pipe 7 of the drive, the valve being denoted by the reference numeral 9 and carrying a pointer cooperating with a graduated scale 8 showing the degree of opening of the valve, said pointer when opposite the zero graduation closing the valve and thereby stopping flow of fluid through the outlet 7. Valve 9 is a two-way and is rotatable in both directions and is preferably provided with a bleeder orifice 39a for permitting inflow of air and a small amount of lubricant for lubricating the inner impeller housing 21 and blades 23 in the impeller 6a when the impeller is non-rotating, the air allowing shaft 6 to idle more freely.

In operation, when the valve 9 is fully opened and the shaft 13a is rotated by a prime mover (not shown), the hub 3 and outer impeller housing 4 and its end housing 5 will rotate as a unit with drive shaft 13a, and the fluid under vacuum entering the unit through the pipe 10 will be drawn out without obstruction into the area 21b between the impeller 6a and the top of inner impeller housing 21, while at the same time the fluid in area 21c will be forced out through the ducts 21a, ports 27a, and duct 3c and will be discharged through the outlet pipe 7, and thus the impeller 6a and its driven shaft 6 will remain stationary, the fluid being merely drawn through the inlet duct 3a of the hub without pressure against the blades 23 and being expelled from the areas 21b without pressure through the outlet pipe 7.

As the control valve 9 is being closed, with fluid passing therethrough, part of the flow of fluid is shut off within outlet pipe 7 in a progressive manner, thus building up pressure in the areas 21c between the wall of the inner impeller housing 21 and the impeller 6a, which pressure acts against the blades 23 in the areas 21b, causing the impeller 6a to rotate with the outer impeller housing 4 according to the setting of the valve 9, and thus all parts of the assembly are rotated with the exception of the gland housing 1 which remains stationary, the amount of rotation being proportional to the degree of closing the valve 9. When fully closed the impeller 6a and driven shaft 6 rotate as a unit disregarding any small slippage of the driven shaft 13a. If the direction of the rotation of shaft 13a is reversed, it will be necessary to remove pin 6x, Fig. 5, and rotate the inner housing 21 through 180°, replacing the pin 6x in the new position so that the flow of oil will be diverted to the opposite side of the impeller 6a, thus making the fluid clutch operable in the new direction of rotation.

In place of the optional manual control I may provide a governor on the outlet pipe 7 for regulating the speed of flow of the fluid through said outlet, the same being automatically adjustable as to overload and underload. The governor is illustrated in Figs. 1, 6, 8, and 12, and consists of a housing 28 having diametrically opposed ducts 28b and 28c communicating with a bore 28a disposed transversely of the outlet pipe 7, said bore 28a having a lateral extension 28d (Fig. 8), the outer end of which is connected by a duct 28e with the lower duct 28c. The outer end of the extension 28d is closed by a cap 28f, a gasket 28g being preferably interposed between the cap and the end of the lateral extension to make the connection oil-tight. The inner end of the bore 28a is connected by a duct 28k with the upper bore 28b of the housing 28 for the purpose of acting as a bleeder.

The bore 28a is provided with a tubular extension 28h of reduced diameter which is threaded as shown in Fig. 8 to receive the tapped bore of a sleeve 30 which is preferably calibrated at its inner end as at 30b, Fig. 12, overlying the housing 28 so as to indicate the setting thereof. Sleeve 30 has a reduced bore 30a adjacent its outer end, and an internal annular shoulder 30e is arranged between the larger threaded inner bore and the reduced outer bore 30a, said shoulder being of same diameter as the valve stem 31 hereinafter referred to.

At the outer end of the sleeve 30 beyond the reduced bore 30a is an enlarged bore 30d which is threaded at its outer end to receive a cap 32, which seals the outer end thereof. The stem 31 passes through the sleeve 30, through the bores 30d, 30a and the shoulder 30e and is connected with a cylindrical valve 33 having an annular groove 33a therein adapted when opposite the ports 28b, 28c to establish communication between the sections of the outlet pipe 7, but when the valve 33 is shifted axially of the bore 28a in one direction the passage will be progressively closed, or progressively opened when shifted in the other direction.

The outer end of the stem 31 carries nuts 34 separated by washer 35 and a spring 36 is disposed around the stem between the nuts 34 and the annular shoulder 30e of sleeve 30, while a second spring 37 is disposed around the stem 31 between the annular shoulder 30e and the valve 33, said spring 37 passing through the reduced bore of the housing 28. Springs 36 and 37 thus act in opposite directions, spring 36 tending to move the valve 33 to the right, Fig. 8, and spring 37 tending to push the valve 33 to the left, Fig. 8.

By the above construction the normal setting of the valve 33 is controlled by rotation of the calibrated sleeve 30 on the housing 28, thereby shifting the valve 33 by action of the oppositely acting springs 36—37 to the desired position of registry of the annular groove 33a of the valve 33 with respect to the opposed ducts 28b, 28c in the housing. If the pressure of fluid in the outlet pipe 7 between the governor and the gland housing 1 increases, the fluid will be by-passed through the duct 28e to the outer end of the valve 33 into the space between the outer end of the valve 33 and the cap 28f compressing spring 37 and closing the valve 33 accordingly. If the pressure in said portion of the outlet pipe 7 decreases, spring 37 will force the valve 33 to the left (Fig. 8) to compensate for underload forcing the fluid in chamber 28d back through duct 28e, thereby increasing the flow of fluid from the housing 1. Thus, the valve acts as an efficient overload or underload torque governor to maintain the speed of the drive shaft 6 and impeller 6a constant according to the setting of the sleeve 30 regardless of fluctuations of a variable torque load.

It is desirable for a machine tool cutter to run at the same speed when the cutter is free or when same is in the work. When the cutter is in the work a greater torque is required and this would normally tend to slow down shaft 6 by forcing more oil through passages 28c and 33a by a rise in pressure, but due to the oppositely acting springs 36 and 37 a rise in pressure would shift valve 33 to the left (Fig. 8) and close off passage 28c, so as to maintain a constant volume of flow to maintain a constant speed of rotation of shaft 6.

As shown in Figs. 6, 8 and 12, in the optional manual control the valve 9 may be used as a bleeder valve, same being mounted in a casing 39 through which extends a small hole 39a for air which may enter duct 39e within pipe 39f which is connected to inlet pipe 10. The valve 9 is held within casing 39 by a nut 38.

While in the specification I have described the shaft 13a as being the drive shaft and shaft 6 the driven shaft, obviously shaft 6 could be the drive shaft and shaft 13a the driven shaft without necessitating any mechanical alteration of the functional parts.

I do not limit my invention to the exact form shown in the drawings, for obviously changes may be made therein within the scope of the claims.

I claim:
1. A variable speed fluid drive comprising a housing; a hub journaled therein carrying a drive shaft; said housing having inlet and outlet grooves communicating through ducts with fluid inlet and outlet pipes; said hub having annular inlet and outlet grooves opposite those in the housing connected by ducts in the hub terminating at opposed points at one end of the hub adjacent the periphery thereof; an outer impeller housing extending from the said end of the hub and having a closed outer end; an inner impeller housing within the outer housing having half of its bore disposed eccentrically of the other half; means for fixedly securing the inner housing within the outer housing with the mid points of the radial and eccentric portions of the bore disposed opposite the ends of the ducts in the hub; the inner end of the radial portion of the inner impeller chamber being cut away opposite its related duct in the hub; a driven shaft extending through the closed end of the outer housing and journaled in said end of the hub; an impeller fixedly mounted on the driven shaft; a series of blades mounted in the impeller and engaging the inner wall of the inner housing; and means for controlling the flow of oil through the outlet pipe to control the speed of rotation of the driven shaft.

2. In a drive as set forth in claim 1, said hub having an annular recess adjacent the outer impeller housing to provide an annular drainage space between the housing and hub to collect fluid; and means for withdrawing the fluid from said space.

3. In a drive as set forth in claim 1, said driven shaft having a bore communicating with ducts in the impeller extending to the bottoms of the blade slots in the impeller; and said hub having a further duct communicating with the bore of the driven shaft and with one of the first mentioned ducts in the hub, to provide vacuum or pressure beneath the blades.

4. In a drive as set forth in claim 1, said control means comprising a manually controlled valve in the outlet pipe adapted to progressively restrict the flow of fluid therethrough, said valve carrying a pointer cooperating with a graduated scale; and said valve having a bleeder orifice for admitting air and lubricant for lubricating the inner impeller housing and blades in the impeller when the impeller is non-rotating.

5. A reversible variable speed fluid drive comprising a housing; a hub journaled therein carrying a drive shaft; said housing having annular inlet and outlet grooves communicating through ducts with fluid inlet and outlet pipes connected with the housing; said hub having annular inlet and outlet grooves opposite those in the housing connected by ducts in the hub terminating at opposite points at one end of the hub adjacent the periphery thereof; an outer impeller housing extending from said end of the hub and having a closed outer end; an inner impeller housing within the outer housing having substantially half of its bore disposed eccentrically of the other half; means for fixedly securing the inner housing in two positions disposed 180° apart within the outer housing with the mid points of the radial and eccentric portions of the bore disposed opposite the ends of the ducts in the hub; the inner end of the radial portion of the inner impeller chamber being cut away opposite its related duct in the hub; a driven shaft extending through the closed end of the outer housing and journaled in said end of the hub; an impeller fixedly mounted on the driven shaft; a series of blades mounted in the impeller and engaging the inner wall of the inner housing; and means for controlling the flow of oil through the outlet pipe to control the speed of rotation of the driven shaft.

6. In a drive as set forth in claim 5, said hub having an annular recess adjacent the outer impeller housing to provide an annular drainage space between the housing and hub to collect fluid; and means for withdrawing the fluid from said space.

7. In a drive as set forth in claim 5, said control means comprising a manually controlled valve in the outlet pipe adapted to progressively restrict the flow of fluid therethrough, said valve carrying a pointer cooperating with a graduated scale; and said valve having a bleeder orifice for admitting air and lubricant for lubricating the inner impeller housing and blades in the impeller when the impeller is non-rotating.

8. In a drive as set forth in claim 5, said inner housing fixing means comprising a pin in the end of the inner impeller housing adapted to enter holes spaced 180° apart in the said end of the hub.

9. A reversible variable speed fluid drive comprising a gland housing; a hub journaled therein carrying a drive shaft at one end and an enlarged head at the other end; spaced gland packings between the housing and hub forming annular inlet and outlet chambers around the hub connecting with annular inlet and outlet grooves in the housing which communicate through ducts with fluid inlet and outlet pipes connected with the housing; said hub having annular inlet and outlet grooves communicating with the said chambers connected by ducts in the hub terminating at the outer end of the enlarged head adjacent the periphery thereof and disposed opposite each other; means for maintaining the hub in the housing; an outer impeller housing extending from the outer end of the enlarged head having a closed outer end; an inner impeller housing within the outer housing having substantially half of its bore disposed eccentrically of the other half; means for fixedly securing the inner housing in two positions disposed 180° apart within the outer housing with the mid points of the radial and eccentric portions of the bore disposed opposite the ends of the ducts in the hub; the inner end of the radial portion of the inner impeller chamber being cut away opposite its related duct in the hub; a driven shaft extending through the closed end of the outer housing and journaled in the outer end of the enlarged hub; an impeller fixedly mounted on the driven shaft; a series of blades mounted in the impeller and engaging the inner wall of the inner impeller housing; and means for controlling the flow of oil through the outlet pipe to control the speed of rotation of the driven shaft.

10. In a drive as set forth in claim 9, a thrust plate disposed between the impeller and enlarged end of the hub and having ports opposite the ducts in the hub.

11. In a drive as set forth in claim 9, said driven shaft having a bore communicating with ducts in the impeller extending to the bottoms of the blade slots in the impeller; and said hub having a further duct communicating with the bore of the driven shaft and with one of the first mentioned ducts in the hub, to provide vacuum or pressure beneath the blades.

12. In a drive as set forth in claim 9, said inner housing fixing means comprising a pin in the end of the inner impeller housing adapted to enter holes spaced 180° apart in the said end of the hub.

VERNON E. GLEASMAN.

REFERENCES CITED

The following references are of record in the file of this patent:

UNITED STATES PATENTS

| Number | Name | Date |
|---|---|---|
| 1,298,979 | Long | Apr. 1, 1919 |
| 1,567,912 | Carey | Dec. 29, 1925 |
| 1,748,436 | Arkin | Feb. 25, 1930 |
| 1,878,078 | Walton | Sept. 20, 1932 |
| 1,935,400 | Junkers | Nov. 14, 1933 |
| 2,049,673 | Star | Aug. 4, 1936 |
| 2,052,429 | Tyler | Aug. 25, 1936 |
| 2,146,717 | Berger | Feb. 14, 1939 |
| 2,201,878 | Atkins et al. | May 21, 1940 |
| 2,313,049 | Cook | Mar. 9, 1943 |
| 2,409,995 | Morton | Oct. 22, 1946 |